United States Patent
Hande et al.

(10) Patent No.: US 11,558,778 B2
(45) Date of Patent: Jan. 17, 2023

(54) TECHNIQUES FOR FILE AWARE COMMUNICATIONS

(71) Applicant: QUALCOMM Incorporated, San Diego, CA (US)

(72) Inventors: Prashanth Haridas Hande, San Diego, CA (US); Jay Kumar Sundararajan, San Diego, CA (US); Yeliz Tokgoz, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/893,239

(22) Filed: Jun. 4, 2020

(65) Prior Publication Data

US 2020/0389813 A1    Dec. 10, 2020

Related U.S. Application Data

(60) Provisional application No. 62/859,470, filed on Jun. 10, 2019, provisional application No. 62/858,701, filed on Jun. 7, 2019.

(51) Int. Cl.
*H04W 28/06* (2009.01)
*H04W 24/08* (2009.01)
*H04L 67/06* (2022.01)

(52) U.S. Cl.
CPC ............. *H04W 28/06* (2013.01); *H04L 67/06* (2013.01); *H04W 24/08* (2013.01)

(58) Field of Classification Search
CPC ....... H04L 67/06; H04L 1/1825; H04L 47/24; H04L 1/0002; H04L 47/25; H04L 47/14; H04W 24/08; H04W 28/06; H04W 28/0236
See application file for complete search history.

(56) References Cited

U.S. PATENT DOCUMENTS

| | | | |
|---|---|---|---|
| 2016/0277209 A1* | 9/2016 | Leiba | H04W 40/12 |
| 2017/0339028 A1* | 11/2017 | Holness | H04L 49/555 |
| 2017/0359749 A1 | 12/2017 | Dao | |
| 2018/0167436 A1* | 6/2018 | Han | H04L 43/0888 |
| 2020/0036983 A1* | 1/2020 | Wang | H04N 21/8153 |
| 2020/0162364 A1* | 5/2020 | Chhabra | H04L 43/0852 |
| 2020/0169856 A1* | 5/2020 | Yang | H04L 67/63 |
| 2021/0235271 A1* | 7/2021 | Bergquist | H04W 12/088 |
| 2021/0297535 A1* | 9/2021 | Puente Pestaña | H04L 41/0893 |

OTHER PUBLICATIONS

International Search Report and Written Opinion—PCT/US2020/036288—ISAEPO—dated Sep. 22, 2020.

* cited by examiner

*Primary Examiner* — Syed Ali
(74) *Attorney, Agent, or Firm* — Patterson + Sheridan, L.L.P.

(57) ABSTRACT

Certain aspects of the present disclosure provide techniques for wireless communication. The method generally includes determining one or more target metrics associated with a file having a plurality of packets, the plurality of packets comprising at least one of a plurality of uplink packets or a plurality of downlink packets, determining one or more communication parameters for communicating the plurality of packets according to the one or more target metrics associated with the file, and communicating the plurality of packets with a second network entity in accordance with the determined one or more communication parameters.

28 Claims, 10 Drawing Sheets

| 5QI Value | PDB | PER | Default MDBV | Example Services |
|---|---|---|---|---|
| 1 | 100 ms | $10^{-2}$ | N/A | Conversation Voice |
| 2 | 150 ms | $10^{-3}$ | N/A | Conversational Video |
| 6, 8, 9 | 300 ms | $10^{-6}$ | N/A | Video; TCP-based |
| ... | ... | ... | ... | ... |
| 80 | 10 ms | $10^{-6}$ | N/A | Low Latency eMBB applications; Augment Reality |
| 81 | 5 ms | $10^{-5}$ | 160 B | Remote Control |
| ... | ... | ... | ... | ... |

FIG. 3

|  | VR Split Rendering | AR Split Computation | Cloud Gaming |
|---|---|---|---|
| HMD/ Device | Head-mounted with 5G modem attached | Head-mounted with USB/Bluetooth connection to "puck" or smartphone with 5G modem | 5G smartphone or tablet |
| 5G Usage | QoS | QoS | QoS/OTT |
| Location | Enterprise-indoor, residential-indoor, outdoor | Enterprise-indoor, outdoor | Outdoor |
| Mobility | Limited to head movements and restricted body movements, high-speed (e.g., VR in the back of a moving vehicle) | Pedestrian, high-speed | Static, high-speed |

FIG. 4

TECHNIQUES FOR FILE AWARE COMMUNICATIONS

CROSS-REFERENCE TO RELATED APPLICATION(S)

This application claims benefit of and priority to U.S. Provisional Application No. 62/858,701, filed Jun. 7, 2019, and U.S. Provisional Application No. 62/859,470, filed Jun. 10, 2019, both of which are hereby assigned to the assignee hereof and hereby expressly incorporated by reference herein in their entirety as if fully set forth below and for all applicable purposes.

BACKGROUND

Field of the Disclosure

Aspects of the present disclosure relate to wireless communications, and more particularly, to techniques for file aware communications.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a first network entity. The method generally includes determining one or more target metrics associated with a file having a plurality of packets, the plurality of packets comprising at least one of a plurality of uplink packets or a plurality of downlink packets. The method may also include determining one or more communication parameters for communicating the plurality of packets according to the one or more target metrics associated with the file. The method may also include communicating the plurality of packets with a second network entity in accordance with the determined one or more communication parameters.

Certain aspects provide a first network entity for wireless communication. In some examples, the first network entity comprises a memory and a processor coupled to the memory. Generally, the memory and the processor are configured to determine one or more target metrics associated with a file having a plurality of packets, the plurality of packets comprising at least one of a plurality of uplink packets or a plurality of downlink packets. In some examples, the memory and processor are configured to determine one or more communication parameters for communicating the plurality of packets according to the one or more target metrics associated with the file. In some examples, the memory and processor are configured to communicate the plurality of packets with a second network entity in accordance with the determined one or more communication parameters.

Certain aspects are directed to an apparatus for wireless communication. The apparatus generally includes means for determining one or more target metrics associated with a file having a plurality of packets, the plurality of packets comprising at least one of a plurality of uplink packets or a plurality of downlink packets. The apparatus may also include means for determining one or more communication parameters for communicating the plurality of packets according to the one or more target metrics associated with the file. The apparatus may also include means for communicating the plurality of packets with a network entity in accordance with the determined one or more communication parameters.

Certain aspects are directed to a non-transitory computer-readable storage medium that stores instructions that when executed by a processor of an apparatus cause the apparatus to perform a method for wireless communication. In some examples, the method comprises determining one or more target metrics associated with a file having a plurality of packets, the plurality of packets comprising at least one of a plurality of uplink packets or a plurality of downlink packets. In some examples, the method comprises determining one or more communication parameters for communicating the plurality of packets according to the one or more target metrics associated with the file. In some examples, the method comprises communicating the plurality of packets with a network entity in accordance with the determined one or more communication parameters.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 3 is a table illustrating various fifth generation (5G) quality indicators, in accordance with certain aspects of the present disclosure.

FIG. 4 is a table illustrating various use cases for extended reality (XR), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
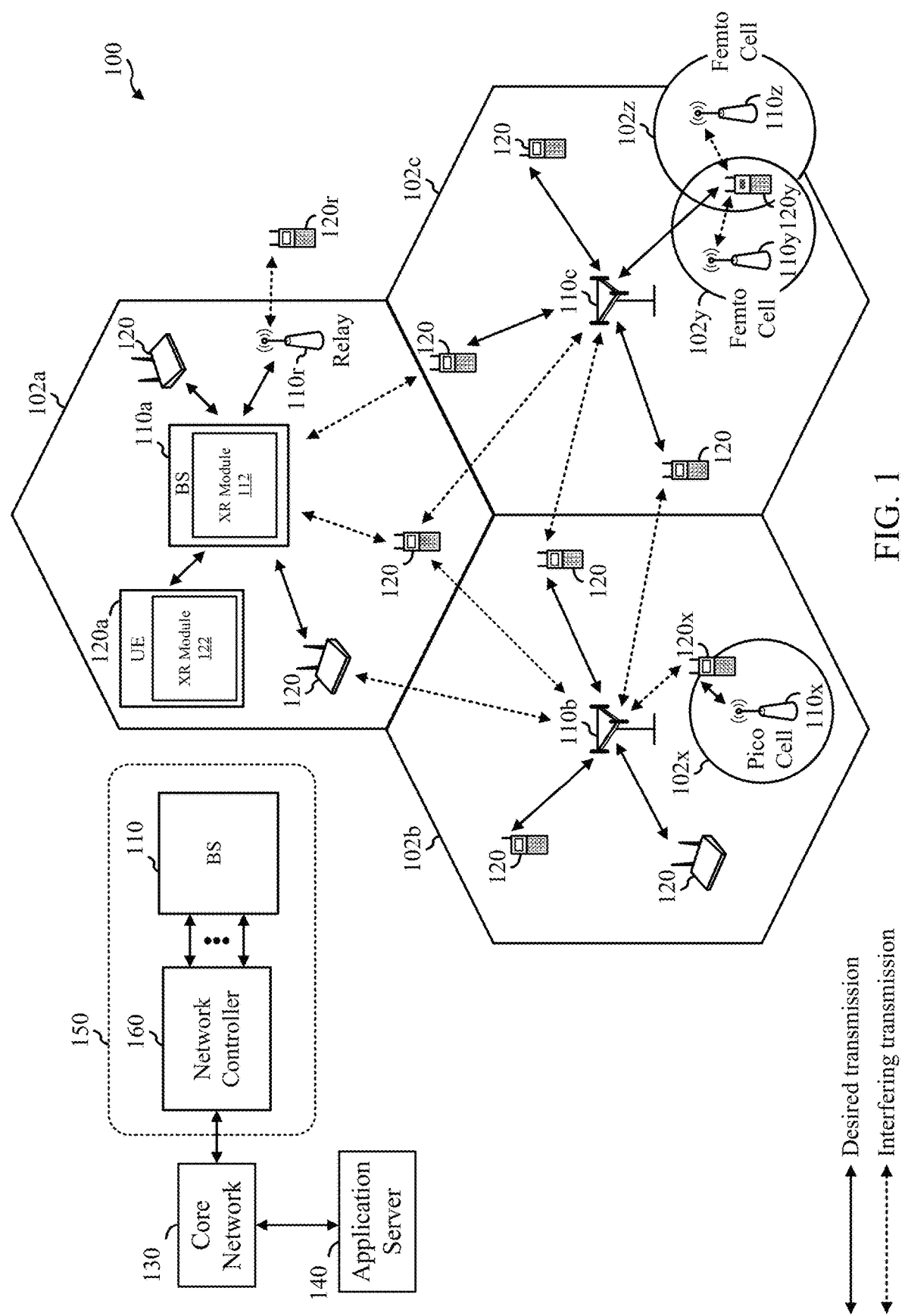
FIG. 1 is a block diagram conceptually illustrating an example telecommunications system, in accordance with certain aspects of the present disclosure.

Aspects of the present disclosure provide apparatus, methods, processing systems, and computer readable mediums for servicing extended reality (XR) applications using file level metrics.

Wireless communication systems, such as 5G new radio (NR) systems, may support services such as XR services that require data communications having a particular quality of service (QoS). In some example, XR QoS requires relatively high bit rates, high reliability, and low latency relative to aspects of other enhanced mobile broadband (eMBB) and ultra-reliable, low-latency communication services. XR applications may support virtual reality (VR) and augmented reality (AR) applications, cloud gaming, and/or the like. As such, XR services may require interoperability between (e.g., 5G) network devices and XR applications.

Generally, wireless communications are packet-centric communications. For example, network devices, such as in an LTE or 5G network, communicate packets of data such that the QoS for the packetized data is determined and communicated on a per-packet basis. In contrast, some examples of XR applications communicate using a file-centric basis. In other words, each file has a particular QoS associated with it, and thus, each packet of that file shares the same QoS requirements of the file.

As such, aspects of the disclosure describe techniques and methods for wireless communication that supports interoperability between (e.g., 5G) network devices and XR applications. For example, an XR application client that runs on a user equipment (UE) may generate a file that contains multiple packets. Each packet in the file may include an identifier that identifies the file that the packet belongs to. The application client then communicates the packets to the UE. The UE may also receive uplink file information that provides the UE with the QoS parameters of the file identified by the packets that the UE received. For example, the uplink file information may include one or more of a file error rate (FER) or a file delay budget (FDB). In some examples, the uplink file information may include one or more of an FER or an FDB for each type of file in a burst of files communicated by the application client to the UE. That is, the uplink file information provides the UE with QoS information for uplink communication of the packets received from the application client.

In a similar manner, a node (e.g., a base station) in a radio access network (RAN) may receive a file from an XR application server, as well as downlink file information configured to provide the RAN node with QoS information for downlink communication of the packets received from the application server.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network (CN) 130. The CN 130 may in communication with one or more BSs 110 and/or UEs 120 via one or more interfaces, as well with an application server (AS) 140, as discussed more detail below with respect to FIG. 2.

The user equipment (UE) 120a includes an XR module 122 that may be configured for managing communication of XR application data generated by application server (AS) 140 (e.g., a cloud server), or an XR application client residing on the UE 120a (e.g., an XR application on the UE 120a) or communicatively coupled to the UE 120a (e.g., a device separate from the UE 120a that communicates XR application files to the UE 120). The BS 110a also includes an XR module 112 that may be configured for managing communication of XR data between the AS 140 and the UE 120a for the XR application, according to aspects described herein.

In some examples, the XR modules (122 and 112) are configured to communicate (e.g., receive and transmit) a plurality of packets received from the XR application and/or AS 140 according to the QoS parameters of the corresponding file or type of the file. In one example, the XR modules (122 and 112) may determine a communication parameter for communicating each of the plurality of packets such that the plurality of packets are communicated within the scope of the QoS requirements for communicating the file that the packets correspond to. For example, a file may have one or more target metrics such as a file error rate (FER) and/or a file delay budget (FDB), or any other suitable QoS requirements that dictate one or more communication parameters for communication of the file. Thus, the XR modules (122 and 112) may determine one or more communication parameters for transmitting each packet contained in the file such that all the packets of the file are communicated according to the target metrics of the file.

A radio access network (RAN) 150 may include a network controller 160 and a BS 110. The RAN 150 may be in communication with the CN 130 and the AS 140. According to certain aspects, the BSs 110 and UEs 120 may be configured for one or more services (e.g., URLLC, eMBB, XR, etc.) involving traffic flows between the application provider (e.g., the AS 140) and/or BSs 110 and UEs 120 associated with one or more applications running on the UEs 120. For example, the UE 120a may be requesting admission (e.g., requesting the BS 110a to serve as a link between the UE 120a and the AS 140) for the one or more traffic flows for a service related to an application.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 160 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
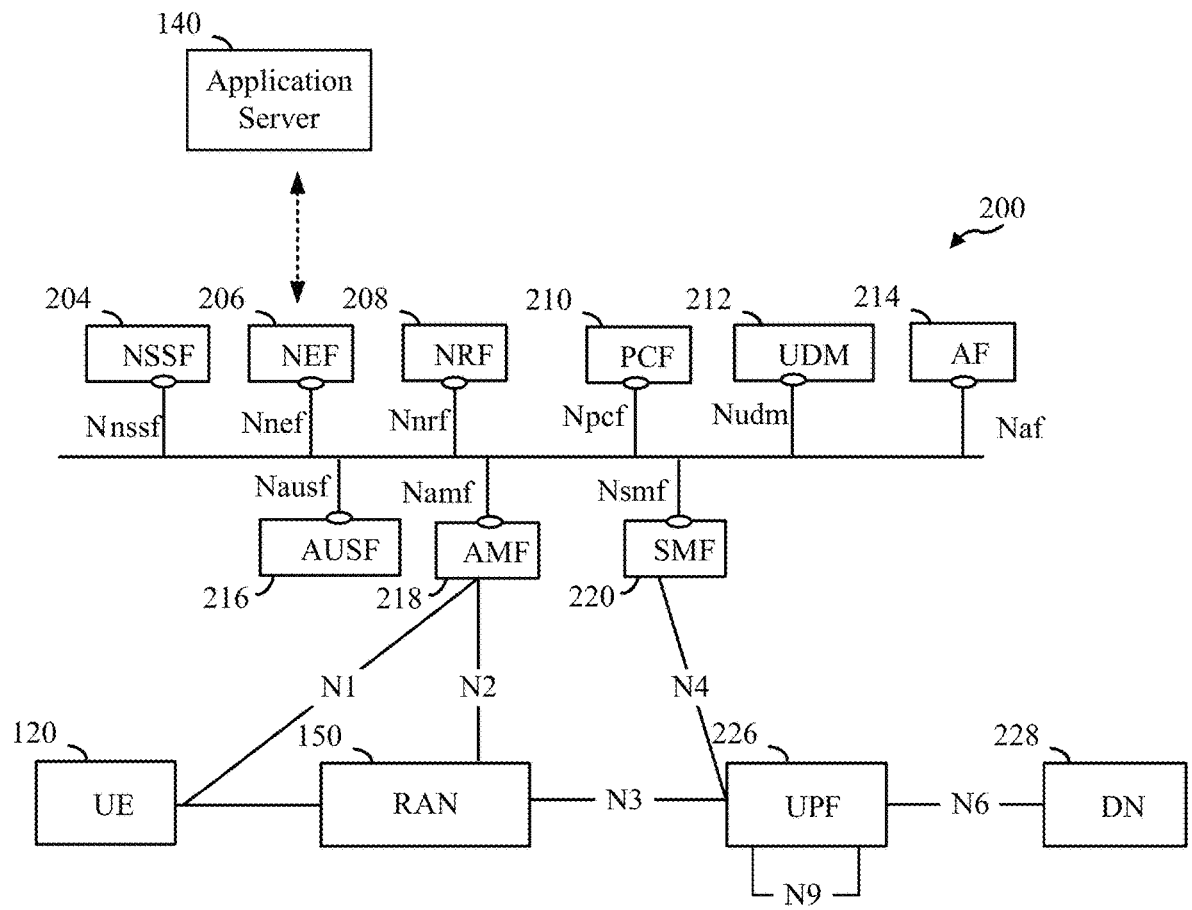
FIG. 2 is a block diagram illustrating an example architecture of a core network (CN) in communication with a radio access network (RAN), in accordance with certain aspects of the present disclosure.

FIG. 2 is a block diagram illustrating an example architecture of a CN 200 (e.g., such as the CN 130 in FIG. 1) in communication with a RAN 150 and AS 140, in accordance with certain aspects of the present disclosure. As shown in FIG. 2, the example architecture includes the CN 200, RAN 150, UE 120, and data network (DN) 228 (e.g. operator services, Internet access or third party services).

The CN 200 may host core network functions. CN 200 may be centrally deployed. CN 200 functionality may be offloaded (e.g., to advanced wireless services (AWS)), in an effort to handle peak capacity. As shown in FIG. 2, the example CN 200 may be implemented by one or more network entities that perform network functions (NF) including network slice selection function (NSSF) 204, network exposure function (NEF) 206, NF repository function (NRF) 208, policy control function (PCF) 210, unified data management (UDM) 212, application function (AF) 214, authentication server function (AUSF) 216, access and mobility management function (AMF) 218, session management function (SMF) 220; user plane function (UPF) 226, and various other functions (not shown) such as unstructured data storage function (UDSF); unified data repository (UDR); 5G-equipment identity register (5G-EIR); and/or security edge protection proxy (SEPP).

The AMF 218 may include the following functionality (some or all of the AMF functionalities may be supported in one or more instances of an AMF): termination of RAN control plane (CP) interface (N2); termination of non-access stratum (NAS) (e.g., N1), NAS ciphering and integrity protection; registration management; connection management; reachability management; mobility management; lawful intercept (for AMF events and interface to L1 system); transport for session management (SM) messages between UE 120 and SMF 220; transparent proxy for routing SM messages; access authentication; access authorization; transport for short message service (SMS) messages between UE 120 and a SMS function (SMSF); security anchor functionality (SEAF); security context management (SCM), which receives a key from the SEAF that it uses to derive access-network specific keys; location services management for regulatory services; transport for location services messages between UE 120 and a location management function (LMF) as well as between RAN 150 and LMF; evolved packet service (EPS) bearer ID allocation for interworking with EPS; and/or UE mobility event notification; and/or other functionality.

SMF 220 may support: session management (e.g., session establishment, modification, and release), UE IP address allocation and management, dynamic host configuration protocol (DHCP) functions, termination of NAS signaling related to session management, downlink data notification, and traffic steering configuration for UPF for proper traffic routing. UPF 226 may support: packet routing and forwarding, packet inspection, quality-of-service (QoS) handling, external protocol data unit (PDU) session point of interconnect to DN 228, and anchor point for intra-RAT and inter-RAT mobility. PCF 210 may support: unified policy framework, providing policy rules to control protocol functions, and/or access subscription information for policy decisions in UDR. AUSF 216 may acts as an authentication server. UDM 212 may support: generation of authentication and key agreement (AKA) credentials, user identification handling, access authorization, and subscription management. NRF 208 may support: service discovery function, and maintain NF profile and available NF instances. NSSF may support: selecting of the network slice instances to serve the UE 120, determining the allowed network slice selection assistance information (NSSAI), and/or determining the AMF set to be used to serve the UE 120.

NEF 206 may support: exposure of capabilities and events, secure provision of information from external application to 3GPP network, translation of internal/external information. AF 214 may support: application influence on traffic routing, accessing NEF 206, and/or interaction with policy framework for policy control. As shown in FIG. 2, the CN 200 may be in communication with the AS 140, UE 120, RAN 150, and DN 228. In some examples, the CN 200 communicates with the external AS 140 via the NEF 206 and/or AF 214.

A communication system such as the wireless communication network 100 (e.g., RAN 150) may provide communication services to a UE (e.g., UE 120/120a). For example, 5G NR may support services such as enhanced mobile broadband (eMBB) service targeting wide bandwidth (e.g., 80 MHz or beyond), ultra-reliable low-latency communication (URLLC) service, and others including XR services discussed in more detail below. These services may include latency and reliability requirements. These services may also have different transmission time intervals (TTI) to meet respective quality of service (QoS) requirements.

The traffic requirements for a service may be summarized via a set of target metrics (e.g., QoS parameters) and associated with the traffic flow that supports that service. The parameters may include a file error rate (FER) or a packet error rate (PER), a file delay budget (FDB) or a packet delay budget (PDB), and/or a guaranteed bit rate (GBR) (not shown). The FER/PER may be the ratio, in percent, of successfully received files/packets. For example, the PER may define an upper bound for the rate of PDUs (e.g. IP packets) that have been processed by the sender of a link layer protocol (e.g. RLC in RAN of a 3GPP access) but that are not successfully delivered by the corresponding receiver to the upper layer (e.g. PDCP in RAN of a 3GPP access). Thus, the FER/PER may define an upper bound for a rate of non-congestion related file/packet losses. FDB/PDB may be defined as an upper bound for the time that a file/packet may be delayed between a source node and a target node. For example, the source node may be a UE (e.g., UE 120) and the target node may be a UPF (e.g., UPF 226) or an AS 140. The GBR may indicate the bandwidth (bit rate) to be guaranteed by the network or AS 140. In some examples, the FER and/or FDB may be set by the AS 140.

A resource type may determine if dedicated network resources related to a QoS flow-level guaranteed flow bit rate (GFBR) value are permanently allocated (e.g., by an admission control function in a radio base station), while a non-GBR QoS flow may be pre-authorized through static policy and charging control. A GBR QoS flow may use either the GBR resource type or the Delay-critical GBR resource type. For traffic flows of type "delay critical GBR" (e.g., for URLLC traffic flows), a parameter called maximum data burst volume (MDBV) is specified to describe the traffic burst. The MDBV denotes the largest amount of data that a RAN node (e.g., base station 110/110a) is required to serve within a period of PDB. The MDBV may be signaled together with a standardized indicator value (e.g., 5QI) to the RAN (e.g., RAN 150), and if it is received, it shall be used instead of the default value.

FIG. 3 illustrates a table 300 illustrating example QoS parameters that may be configured for various services. In some examples, a conversational voice service, a conversational video service (e.g., such as live streaming), and a video service (e.g., such as buffered streaming) and/or TCP-based service (e.g., such as the World Wide Web, email, chat, ftp, p2p file sharing, progressive video, etc.) may be associated with eMBB service. In some examples, remote control service (e.g., a UE being operated remotely, either by a human or a computer, such as a remote driver or a vehicle-to-everything (V2X) application to operate a remote vehicle with no driver or a remote vehicle located in a dangerous environment) may be associated with URLCC. In some examples, the low-latency eMBB applications may be associated with XR service. XR service may refer to services such augmented reality (AR), virtual reality (VR), and cloud gaming. AR and VR service may be characterized by a human being interacting with the environment or people, or controlling a UE, and relying on audio-visual feedback. In the use cases like VR and interactive conversation the latency requirements include the latencies at the application layer (e.g., codecs), which could be specified outside of 3GPP.

The QoS parameters and services shown in the Table 300 in FIG. 3 are merely illustrative, and various other QoS parameters and services may be specified.

At high PDB values (e.g., equal to or exceeding 100 ms), the burst of a traffic over the PDB range may be closely approximated by the GBR*PDB. For some traffic flows, measured over every PDB, the percentile of times when the burst exceeds GBR*PDB is small relative to the PER. Dropping packets of such bursts will have negligible effect on the PER of the traffic. Thus, for such traffic flows it may not be important to convey the size of the traffic burst. However, for traffic flows at low PDB and low PER values, the volume of traffic that the 5G system handles can be much higher than GBR*PDB. In this case, it is useful to describe the traffic burst.

As mentioned above, the MDBV is specified for the traffic flows of type "Delay critical GBR" which are expected to handle traffic of low throughput. Thus, in some cases the range of values for MDBV is capped at 4095 Bytes (e.g., when signaled on 5G network interfaces). Even with a PDB of 1 ms, the throughput cap of 4095 bytes implies that the maximum throughput on that flow can be no more than 4095 bytes/ms (i.e., around 32.76 Mbps). The supported throughput may be even lower on traffic flows with larger PDB values. However, for certain services, such as XR services (e.g., AR, VR, cloud gaming), the throughput requirements (e.g., up to 250 Mbps) and PDB requirements (e.g., 25 ms) can be higher.

As discussed, 5G NR may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency (e.g., packet delay budget (PDB)) and reliability requirements (e.g., packet error rate (PER)), and may also have different transmission time intervals (TTI) to meet respective quality of service (QoS) requirements. Extended reality (XR) is wireless communication service for services requiring low latency (e.g., a packet delay budget (PDB) of between 5 ms and 25 ms) and high bit-rate, e.g., a packet error rate of less than or equal to 1e-3). However, certain XR services may include latency (e.g., file delay budget (FDB)) and reliability requirements (e.g., file error rate (FER)) that are different from 5G NR to meet respective QoS requirements.

FIG. 4 illustrates a table 400 illustrating various use cases for XR. For example, VR may be used for cloud gaming, virtual reality (VR) split rendering, an augmented reality (AR) split computations. Cloud gaming generally refers to gaming on a user device where at least some of the graphical processor unit (GPU) processing is performed on a cloud server (e.g., application server 140 of FIG. 1) where more powerful GPUs may be implemented. Similarly, GPU processing for VR and AR may be split between a GPU on the cloud and a GPU on the user device. However, cloud gaming, split rendering, and split computation services require low latency to maintain an acceptable gaming experience. As illustrated, cloud gaming may be implemented using QoS or over the top (OTT) on the 5G network. Moreover, different use cases may have different location and mobility requirements, as illustrated.

Figure 5:
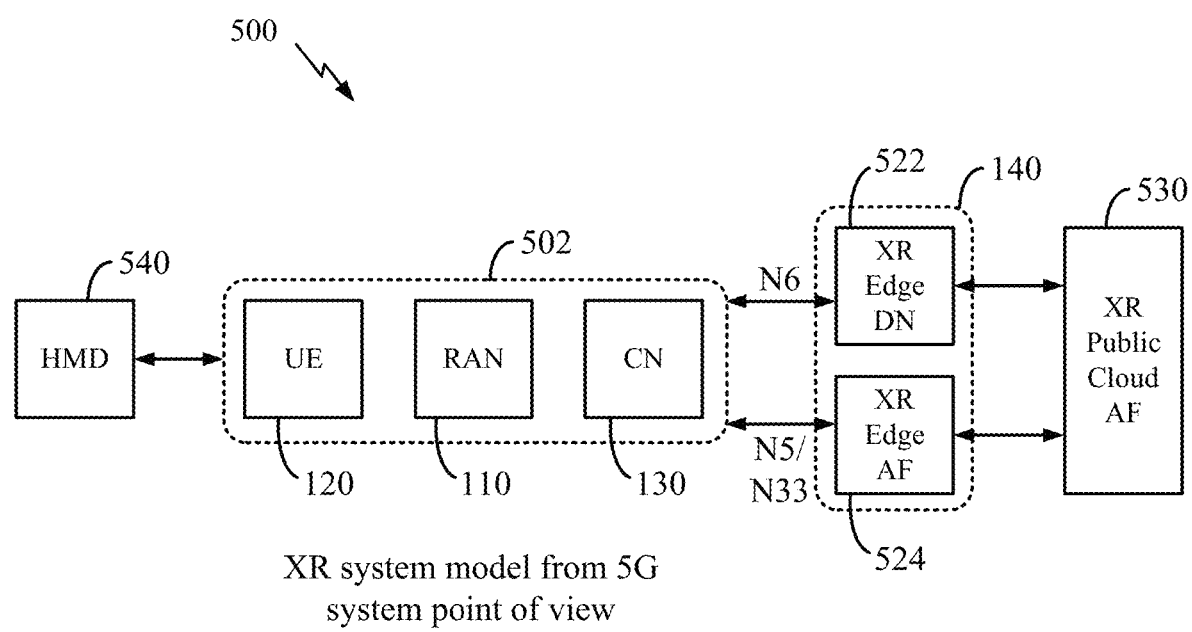
FIG. 5 illustrates a wireless communication system for XR, in accordance with certain aspects of the present disclosure.

FIG. 5 is a block diagram illustrating a wireless communication system 500 for XR. As illustrated, a 5G system 502 may include a UE 120, a radio access network (RAN) 110, and a core network (CN) 504 (e.g., CN 130 of FIG. 1 or CN 200 of FIG. 2). In certain aspects, the UE 120 may be associated with a head mount display (HMD) 540 for VR or AR applications. As illustrated, the 5G system 502 may communicate with an edge cloud server 140, which may include logic entities such as an XR edge data network (DN) 522 and an XR edge application function 524. An edge cloud server generally refers to a cloud server located closer to the UE, allowing communication of data with lower latency for various applications as described herein. For example, CN to XR edge server latency may be negligible as compared to the 5G system latency. The edge cloud server 140 may be associated with an XR public cloud AF 530, as illustrated. The CN 504 may communicate with the XR edge DN via an N6 interface (user plane). Moreover, the CN 504 may communicate with the XR edge AF via an N5 and N33 interfaces. N5 and N33 are interfaces of the XR edge application function 524 to the 5G system.

Figure 6:
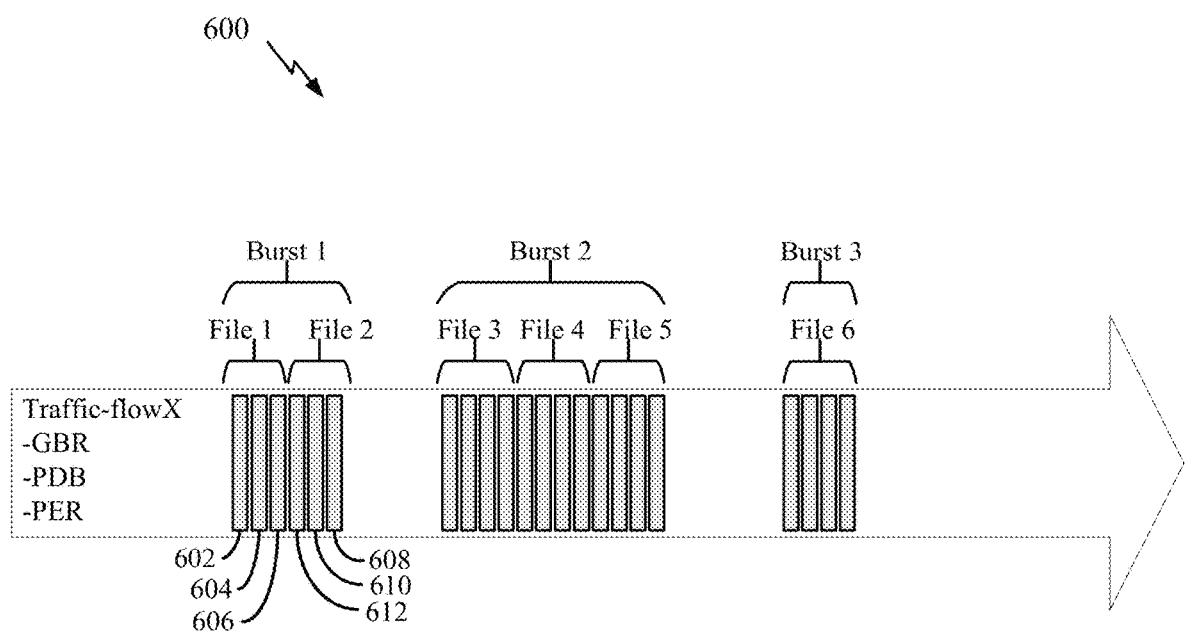
FIG. 6 illustrates a traffic flow for communication of packets associated with various files, in accordance with certain aspects of the present disclosure.

FIG. 6 is a block diagram illustrating a traffic flow 600 for communication of packets (e.g., internet protocol (IP) packets) associated with various files. For example, packets 602, 604, 606 may be associated with a file (e.g., file1) and packets 608, 610, 612 may be associated with another file (e.g., file2). Files may be sent in multiple bursts. For example, files 1 and 2 may be sent in a first burst (e.g., burst1), files 3, 4, 5, may be in sent in a second burst (e.g., burst 2), and file 6 may be sent in a third burst (e.g., burst3), as illustrated. In other words, a "file" may generally relate to a set of packets jointly processed by an XR application or XR application server. The traffic flow 600 may be associated with a certain communication parameters, such as GBR, PBR, and/or PDB that may be configured by the BS 110a or UE 120a based on target metrics (e.g., FER and/or FDB) of each of the files. A "burst" may generally relate to one or more files generated by the application at about the same time.

As discussed, the 5G system may be only aware of packet level metrics. In other words, the traffic flow 600 may be controlled via packet filters and metrics according to PER and PDB. However, XR applications might specify metrics on a group of packets (e.g., file). For instance, XR applications may specify an FER rather than PER, or a FDB instead of a PDB. Moreover, the reliability requirements of files may vary. In some cases, an XR application may specify a policy with regards to file handling. For instance, an application may specify that a file may be used only if all packets of a file are received, or that a contiguous stream of packets up to the first packet in error may be used.

Example Techniques for File Aware Communications

When file level metrics such as FER can be translated to packet level metrics such as PER for the 5G system, information may be lost, resulting in inaccurate handing of file level requirements of the application. For example, a conversion of packet level metrics to file level metrics assumes that independent packet losses occur. For instance, assuming independent packet losses occur, a 0.083% PER metric for regulator packets (e.g., as opposed to jumbo packets) may be translated to a 1% FER metric. However, in reality, packets losses may be clustered together. Therefore, the 5G system may determine and report that a lower percentage of users have met the packet level metric (e.g., 0.083% PER) when a higher number of users may have actually met the required file level metric (e.g. 1% FER). For instance, 64% of users may have met the 0.083% PER metric, when 100% of users actually met the 1% FER metric.

Thus, certain aspects of the present disclosure are directed to techniques for servicing XR application using file level metrics.

Figure 7:
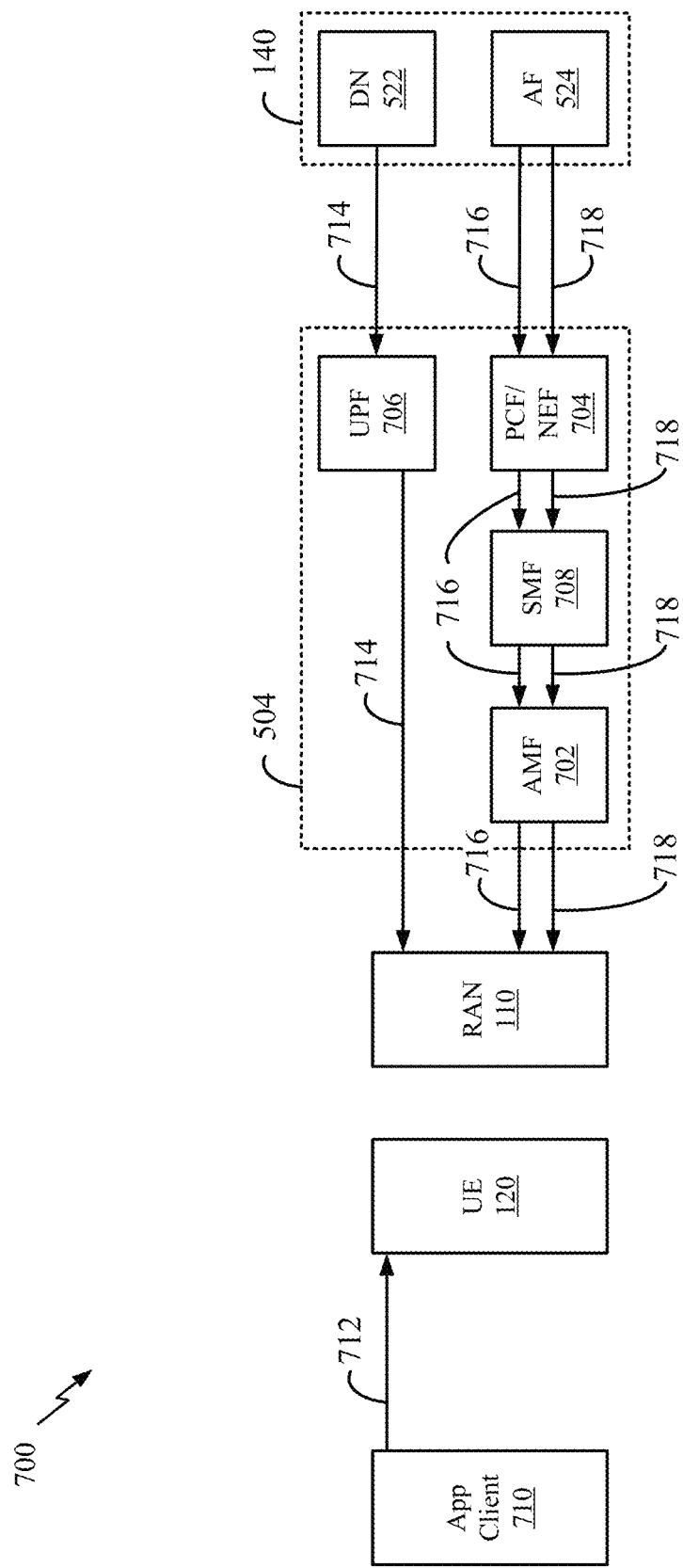
FIG. 7 illustrates communication of file level metric information in a wireless communication system for XR, in accordance with certain aspects of the present disclosure.

FIG. 7 is a block diagram illustrating communication of files and file-level metric information in a wireless communication system 700, in accordance with certain aspects of the present disclosure. As illustrated in FIG. 7, communication paths may be applicable to communication of uplink files 712 and uplink file information 718, as well as downlink files 714 and downlink file information 716. In this case, uplink files are files communicated from an application client 710 to a user equipment (UE) 120, and downlink files are files communicated from an application server 140 to a radio access network (RAN) 110. Of course, the communication structure is not limited to the configuration shown, and may instead include additional or fewer components and/or communication paths. The communication system 700 may include components illustrated in FIGS. 1, 2, and 5.

As illustrated, the RAN 110 may receive a plurality of packets corresponding to a downlink file 714 (e.g., a file of FIG. 6) generated by a data network (DN) 522 of an application server (AS) 140. In some examples, the DN 522 may encapsulate each of the plurality of packets with an indicator configured to identify the downlink file to which each packet belongs. As illustrated, the downlink file 714 may be communicated to the RAN 110 via a user plane function (UPF) 706 of a core network (CN) 504.

The RAN 110 may also receive downlink file information 716 from an application function (AF) 524 of the AS 140, where the downlink file information 716 corresponds to the downlink file 714. The AF 524 may generate and communicate the downlink file information 716 to the RAN 110 via one or more of the a policy control function (PCF)/network exposure function (NEF) 704 of the CN 504, a session management function (SMF) 708 of the CN 504, and access and mobility management function (AMF) 702 of the CN 504, as illustrated. In some examples, the downlink file information 716 includes target metrics (e.g., QoS requirements such as an FER or an FDB) of the downlink file 714 identified by each of the plurality of packets. In some examples, the downlink file information 716 may include one or more additional target metrics for each additional downlink file communicated to the RAN 110 via a burst of files.

Now, having both the plurality of packets of the downlink file 714 and the downlink file information 716, the RAN 110 knows that the plurality of packets belong to a particular file having a certain target metric for its communication. Accordingly, the RAN 110 can communicate the plurality of packets as if they were a homogenous group instead of treating each of the plurality of packets according to their own PER and/or PDB. For example, the RAN 110 will now communicate the group of packets according to the target metric (e.g., FER/FDB) of the corresponding downlink file 714. This is in contrast to a method of converting or deriving a PER or PDB for each packet based on the FER or FDB of the corresponding file, and then transmitting each packet individually and without regard to the file to which the packets belong. Thus, various network algorithms such as rate adaptation target algorithms, HARQ retransmission algorithms, and any other suitable algorithm, can be forced to be implemented more aggressively to meet the target metrics for communicating the group of packets.

Accordingly, various network algorithms may be set by the RAN 110 in order to realize the file level target metrics (e.g., FER/FDB) rather than packet level target metrics (e.g., PER/PDB). For example, if the downlink file 714 has one or more corresponding target metrics, and one of the one or more target metrics is a target FER, then the RAN 110's determination of one or more communication parameters may also include a determination and setting of a rate adaptation target for the communication of each of the plurality of packets in the downlink file 714 such that the communication of the plurality of packets meet the target FER. The RAN 110's determination of one or more communication parameters may also include a determination and setting of a quantity of retransmissions for the communication of each of the plurality of packets in the downlink file 714 such that the communication of the plurality of packets meet the target FER.

In another example, if one of the corresponding target metrics of the downlink file 714 is a target FDB, then the RAN 110's determination of one or more communication parameters may include a determination and setting of a packet delivery deadline of each of the plurality of packets to meet the target FDB.

As discussed, simply converting or deriving a PER or PDB for each packet based on the FER or FDB of the corresponding file can result in lost information and delays. For example, packets of a file can arrive in a 5G system spread out in time due to other traffic at different components in the system, interference, etc., or due to the XR application releasing the packets at different times. If the packets are simply communicated individually according to a derived PER/PDB, the likelihood that the group of packets belonging to a particular file would be communicated according to the FER or FDB is reduced relative to a likelihood that a group of packets treated as a homogenous group and communicated according to a corresponding FER or FDB. Because the packets are spread out, communication of packets by the RAN 110 on an individual basis will result in those packets being communicated over a window of time that is more or less equal to the window of time that the packets are spread over. This also creates problems because the XR application can only use the packets of a file when it has all the packets belonging to the file. Thus, the XR application cannot take advantage of any initial packets it receives from the RAN 110 at the beginning of the window of time.

In contrast, if the RAN 110 communicates the plurality of packets as if they were a homogenous group, the RAN 110 can communicate the group of packets according to the target metric (e.g., FER/FDB) of the corresponding downlink file 714. For example, if the RAN 110 receives the group of packets spread out over a window of time, it can temporarily store (e.g., in a buffer) any initially received packets until it has the entire group of packets. The RAN 110 can then determine one or more communication parameters (e.g., FER and/or FDB, or alternatively, PER and/or PDB) for communicating the plurality of packets according to target metric associated with the file. For example, the RAN 110 can map the FER and/or FDB of the plurality of packets directly to the various network algorithms for communicating the plurality of packets (e.g., bypassing PER/PDB), or the RAN 110 may map the FER and/or FDB to a PER and/or PDB for one or more of the plurality of packets, then map the PER and/or PDB to the various network algorithms.

In some examples, instead of storing the initial packets until all of the plurality of packets are received, the RAN 110 can determine one or more communication parameters (e.g., PER and/or PDB) for communicating the initial packets such that the initial packets are configured to reach their target destination according to the target metric (e.g., FER/FDB) of the corresponding file. For example, the RAN 110 may transmit any initially received packets with a less stringent PER and/or PDB. In this case, the RAN 110 gradually increase the one or more communication parameters of the packets to ensure that the group of packets is communicated according to the FER/FDB of the corresponding file. It should be noted that although the foregoing generally provides a description of operations from the perspective of the RAN 110, aspects of the same operations are also applicable to other network nodes, including the CN 504 and the UE 120.

For example, Still referring to FIG. 7, the UE 120 may be associated with an application client 710 (e.g., HMD 540 of FIG. 5). The application client 710 may communicate uplink files 712 to the UE 120, as illustrated. As with the downlink file 714 described above, the uplink file 712 may be comprised of a plurality of packets, wherein each packet includes an indicator configured to identify the uplink file it corresponds to. The UE 120 may then communicate the uplink files 712 to, for example, the RAN 110 or the AS 140, using the same methods and techniques described above in reference to the RAN 110 communication of downlink files.

It should be noted however, that the RAN 110 may receive the uplink file information 718 from the CN 504. In this example, the AF 524 may generate the uplink file information 718 and communicate the uplink file information 718 to the RAN 110 via the CN 504. In this example, the AMF 702 may communicate the uplink file information 718 to the RAN 110. In some examples, the uplink file information 718 includes target metrics (e.g., QoS requirements such as an FER or an FDB) of the uplink file 712 identified by each of the plurality of packets.

In one example, if the UE 120 receives an uplink file 712 from the application client 710, the UE 120 may request uplink resources for communicating the uplink file 712 to the RAN 110. Because the RAN 110 received the uplink file information 718, the RAN 110 can determine and reserve the uplink resources necessary for the UE 120 to communicate the uplink file 712 to the RAN 110 or the CN 504 in accordance with the target metrics of the uplink file 712. Once the RAN 110 or the CN 504 has received the uplink file 712 from the UE 120, the RAN 110 or CN 504 may determine communication parameters for communicating the uplink file 712 to the AS 140.

In another example, if the CN 504 (e.g., UPF 706) receives a downlink file 714 from the DN 522, the CN 504 may determine communication parameters for communicating the downlink file 714 to the RAN 110 or the UE 120 in accordance with the target metrics of the downlink file 714 provided by the downlink file information 716.

Once the downlink file is received by the RAN 110, the RAN may determine communication parameters for communicating the downlink file 714 to the UE 120 in accordance with the target metrics of the downlink file 714 provided by the downlink file information 716.

Example Techniques for Grouping Packets in File Aware Communications

As indicated above, one or more aspects of the present disclosure provide for communication interoperability between XR applications and 5 G systems to ensure XR application-specific latency and/or reliability requirements in the 5G system. As discussed above, the 5G system can group a plurality of packets according to a file that the plurality of packets correspond to. Here, the file is associated with one or more target metrics for QoS, so a node in the 5G system will group the plurality of packets according to the corresponding file, and determine communication parameters for communicating the plurality of packets according to the target metrics.

Certain aspects of the disclosure also describe grouping packets according to one or both of a corresponding file and a specific types of the file. In some examples, a file may be one of a variety of different types, wherein each type of file corresponds to a latency and/or reliability requirement of that file. Here, these different types of files may benefit from having multiple latency and/or reliability targets that are drastically different from one another. For example, a frame may be communicated between an XR application and a 5G system, wherein the frame contains one or more files. Here, different frames may be compressed with varying levels of importance. Hence, the files in each frame may be associated with a certain file type depending on, for example, a level of importance and/or a type of compression of the frame.

In one example, three types of frames used in video compression include an I-frame (intra-coded type), a P-frame (predicted type), and a B-frame (bi-directional predicted type). Generally, the I-frame may include a complete video frame or image, like a JPG or BMP image file. On the contrary, the P-frame may include only the changes in the image from the previous frame. For example, only the portions of the image that have changed since the previous frame are encoded, whereas the unchanging pixels in the frame (e.g., background) are not stored by the encoder, thus saving space. The B-frame saves even more space by using differences between the current frame and both the preceding and following frames to specify its content.

As described above, some frames, and the files contained in the frames of an XR application may have varying latency and reliability requirements dependent on the type of frame each file is associated with. For example, the latency requirement of a file in a first frame may be lower than the latency requirement of another file of a second frame.

Generally, latency refers to the delay associated with receipt of data at its intended destination, and may be quantized by an FDB/PDB metric. In some configurations, the files of a frame may include data that has a relatively high reliability requirement. For example, the reliability requirement of a file in a first type of frame may be higher than the reliability requirement of a file in a second type of frame. Generally, reliability refers to how consistently data is successfully received by the intended destination without errors, and may be quantized by an FER/PER metric.

Referring back to FIG. 7, the RAN 110 may receive a downlink file 714 that contains a plurality of packets, and downlink file information 716 that identifies the file and the type of file (e.g., the type of compression used on the frame that the file is part of, or whether the file is part of an I-frame, P-frame, or B-frame) that each of the plurality of packets are a part of. The downlink file information 716 may be generated by the AF 524 and communicated to the RAN 110 via the CN 504.

For example, the downlink file information 716 may be received by a policy control function (PCF) or a network exposure function (NEF) of the CN 504. In some examples, PCF/NEF 704 communicates the downlink file information 716 to a session management function (SMF) 708, which then passes the downlink file information 716 to an access and mobility management function (AMF). The RAN 110 may receive the downlink file information 716 in a transmission from the AMF 702.

In certain aspects, the RAN 110 may be configured to use the received downlink file information 716 to determine a file type of a file (e.g., file1 of FIG. 6, wherein file1 has a particular file type) that the RAN 110 received from the AS 140. In this case, the RAN 110 may determine one or more target metrics (e.g., FER and/or FDB) associated with the file based on the file type. In one example, the downlink file information 716 may include a mapping between a file type and a target metric for communicating the file.

In certain aspects, the RAN 110 may be configured to group a plurality of packets received from the AS 140 according to the file identified by the plurality of packets and/or the file type identified by the plurality of packets. Here, the RAN 110 may determine the one or more target metrics associated with each of the plurality of packets based on the determined file type of the file to which the plurality of packets correspond, and then determine one or more communication metrics for communicating the plurality of packets according to the target metrics of the determined file type. For example, the RAN 110 may transmit downlink packets received from the AS 140 via the CN 504, to the UE 120 according to the determined communication metrics, such that the downlink packets are communicated using target metrics that correspond to the file type of the file to which the downlink packets belong.

Similarly, the RAN 110 may transmit uplink packets received from the application client 710 via the UE 120, to the AS 140 via the CN 504 according to the determined communication metrics, such that the uplink packets are communicated using target metrics that correspond to the file type of the file to which the uplink packets belong. In this example, the RAN 110 may provide the UE 120 with the uplink resources for communicating the uplink packets to the RAN 110 based on the target metrics that correspond to the file type. Thus, in certain aspects, the UE 120 may be configured to group a plurality of packets received from the application client 710 into a file according to the file type associated with the file to which each of the plurality of packets belongs. The RAN 110 may then determine the one or more target metrics associated with each of the plurality of packets based on the determined file type, and provide the UE 120 with resources for transmitting the plurality of packets based on the one or more target metrics.

Figure 8:
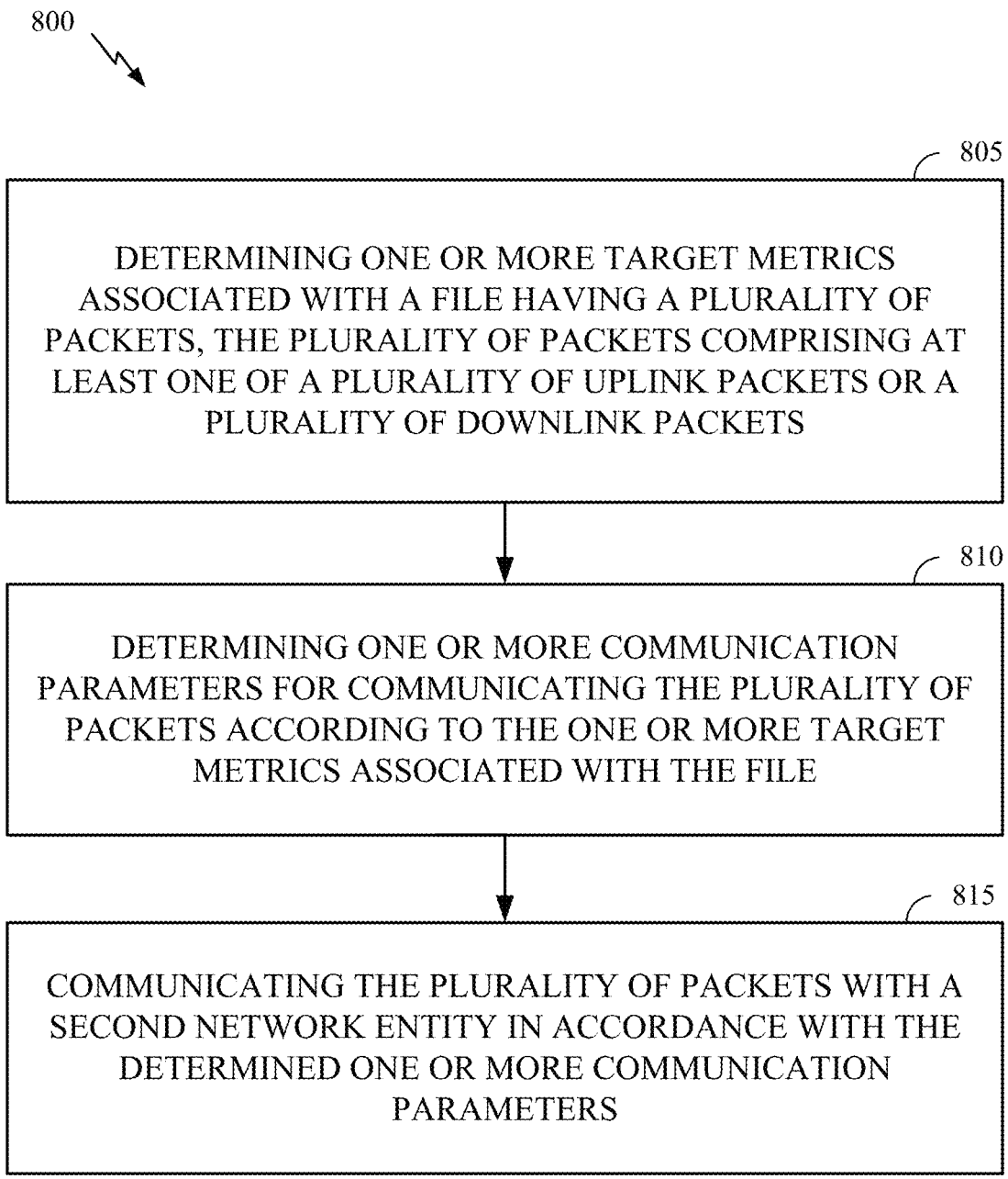
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by a radio access network (RAN) such as a BS (e.g., BS 110 in the wireless communication network 100) or a user equipment (UE) (e.g., UE 120 in the wireless communication network 100). Operations 800 may be implemented as software components that are executed and run on one or more processors (e.g., controller/processor 1040/1080 of FIG. 10). Further, the communication (e.g., transmission and reception) of signals in operations 800 may be enabled, for example, by one or more antennas (e.g., antennas 1034/1052 of FIG. 10). In certain aspects, the transmission and reception of signals may be implemented via a bus interface of one or more processors (e.g., controller/processor 1040) obtaining and/or outputting signals.

The operations 800 may begin, at block 805, by determining one or more target metrics associated with a file having a plurality of packets, the plurality of packets comprising at least one of a plurality of uplink packets or a plurality of downlink packets. For example, the one or more target metrics may include at least one of a target file error rate (FER) associated with a file or a target file delay budget (FDB) associated with the file.

The operations 800 may proceed at block 810, by determining one or more communication parameters for communicating the plurality of packets according to the one or more target metrics associated with the file.

The operations may proceed at block 815, by communicating the plurality of packets with a second network entity in accordance with the determined one or more communication parameters.

In certain aspects, the operations 800 may include communicating each of the plurality of downlink packets in accordance with the one or more communication parameters. In certain aspects, the communicating of the plurality of downlink packets may include transmitting the plurality of downlink packets to a user equipment (UE).

In certain aspects, determining one or more communication parameters for communicating the plurality of packets according to the one or more target metrics associated with the file may include configuring a user equipment (UE) to transmit the plurality of uplink packets in accordance with the one or more communication parameters, and the communication of the plurality of uplink packets may include receiving the plurality of uplink packets from the UE in accordance with the one or more communication parameters.

In certain aspects, each of the plurality of packets comprise one or more of a first indicator configured to identify the file and a second indicator configured to identify a type of the file.

In certain aspects, the plurality of packets comprise at least the second indicator. In certain aspects, the operations 800 include determining one or more target metrics associated with the file comprises determining the one or more target metrics associated with the file type of the file.

In certain aspects, the plurality of packets comprise the first indicator and the second indicator, the method further comprising grouping the plurality of packets according to the file and the file type.

In certain aspects, the one or more target metrics associated with the file comprise at least one of a target file error rate (FER) or a target file delay budget (FDB).

In certain aspects, the one or more target metrics comprise a target file error rate (FER) associated with the file, and wherein determining one or more communication parameters for communicating the plurality of packets further comprises: setting a rate adaptation target for the communication of each of the plurality of packets to meet the target FER; and setting a quantity of retransmissions for the communication of each of the plurality of packets to meet the target FER.

In certain aspects, the one or more target metrics comprise a target file delay budget (FDB) associated with the file, and wherein determining one or more communication parameters for communicating the plurality of packets further comprises setting a packet delivery deadline of each of the plurality of packets to meet the target FDB.

In certain aspects, determining the one or more target metrics associated with the file comprises receiving, from a core network, downlink file information indicating the one or more target metrics associated with the file to which the plurality of downlink packets belong, and wherein the communication of the plurality of packets comprises transmitting the plurality of downlink packets to a user equipment (UE).

In certain aspects, the downlink file information is generated by a data network (DN) external to the core network, and wherein the downlink file information is received via a user plane function (UPF) of the core network.

In certain aspects, determining the one or more target metrics associated with the file comprises receiving, from the second network entity, uplink file information indicating the one or more target metrics associated with the file to which the plurality of uplink packets belong.

In certain aspects, the first network entity is a user equipment (UE) and the second network entity is a radio access network (RAN) node.

In certain aspects, receiving an indication of the one or more target metrics associated with the file from a core network.

In certain aspects, the indication of the one or more target metrics is received from an application function via the core network.

Figure 9:
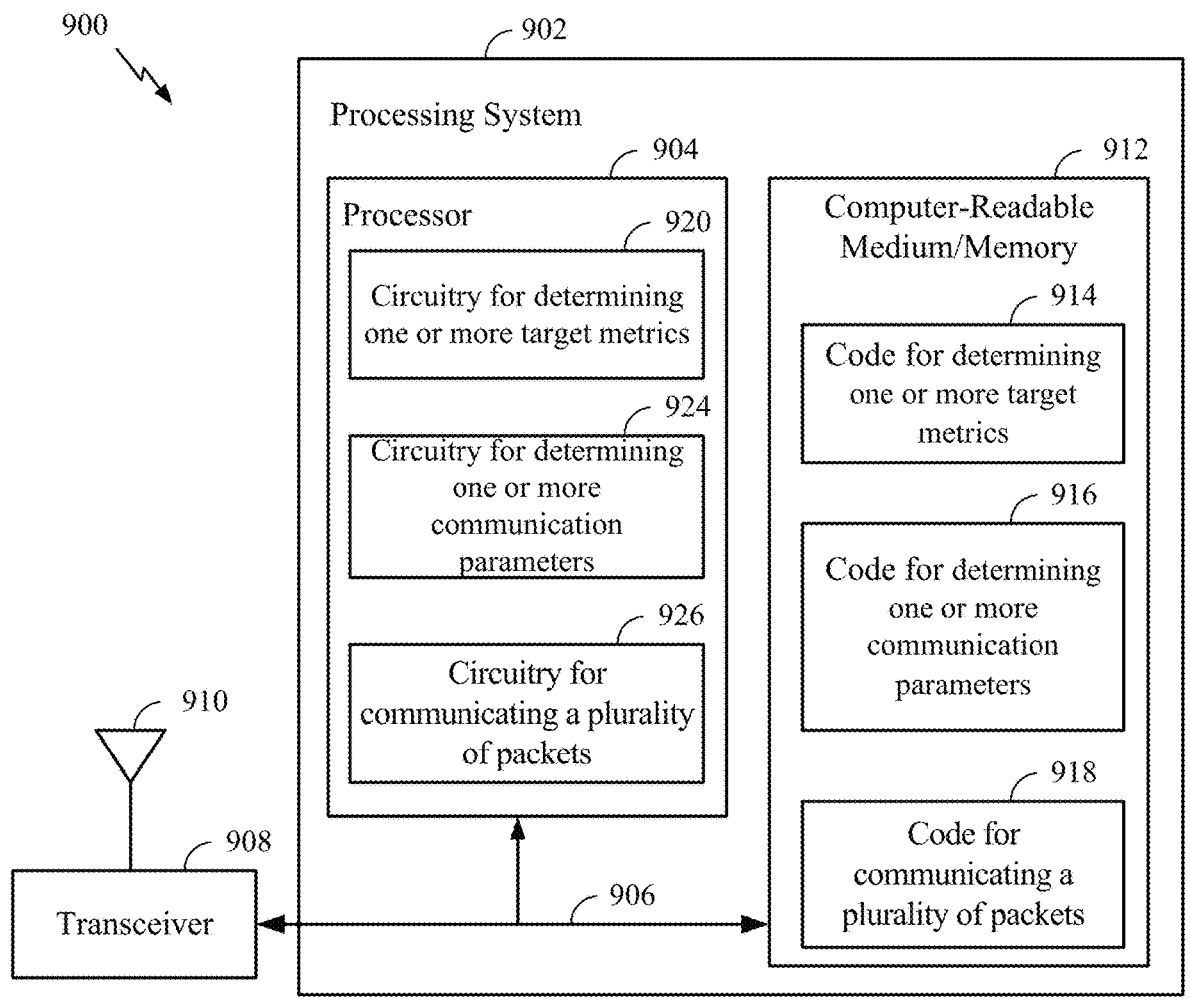
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 8. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 8, or other operations for performing the various techniques discussed herein.

In certain aspects, computer-readable medium/memory 912 stores code for determining one or more target metrics 914, code for determining one or more communication parameters 916, and code for communicating a plurality of packets 918. In certain aspects, the processor 904 has circuitry configured to implement the code stored in the computer-readable medium/memory 912. The processor 904 includes circuitry for determining one or more target metrics 920, circuitry for determining one or more communication parameters 924, and circuitry for communicating a plurality of packets 926.

Figure 10:
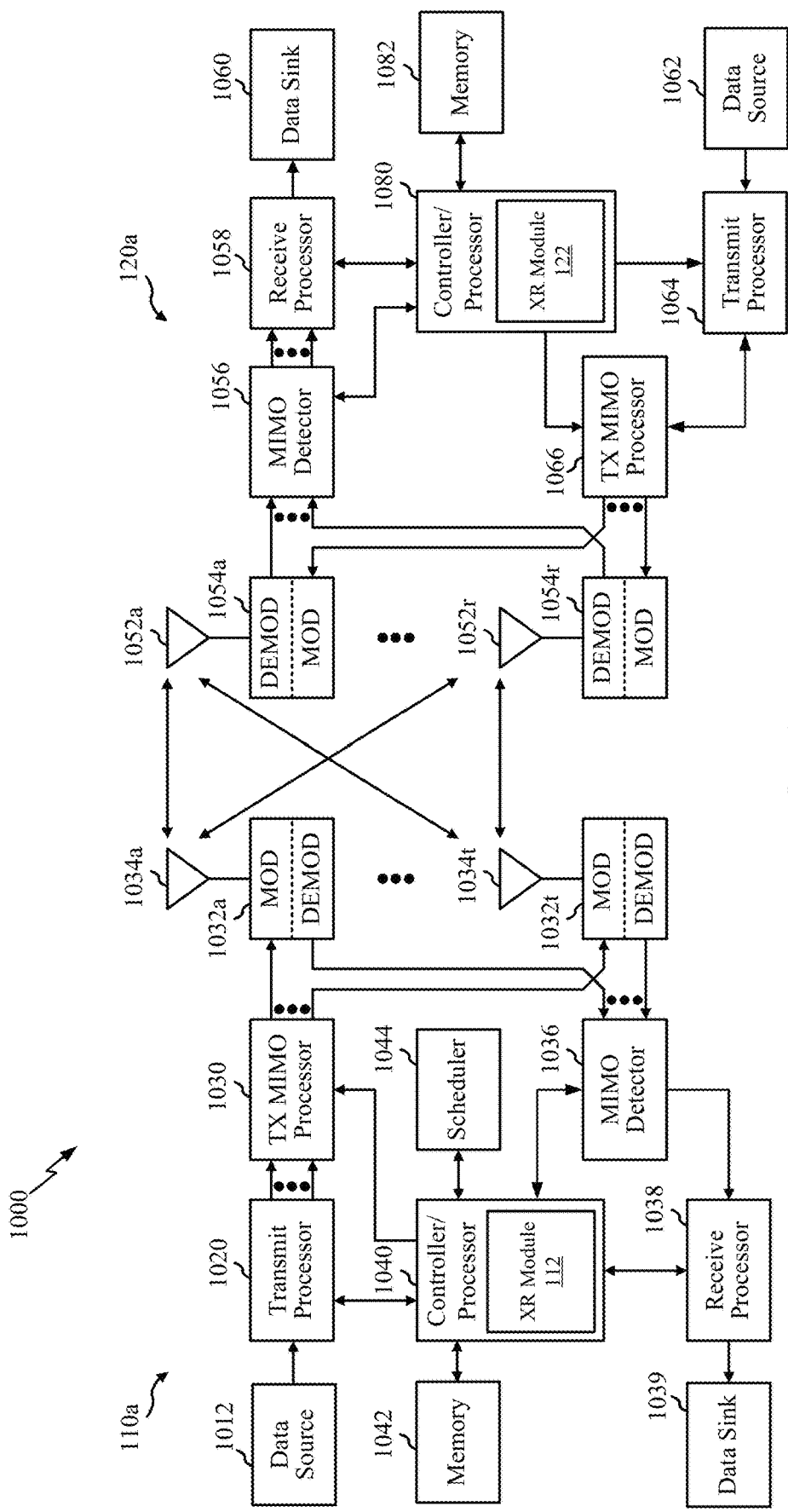
FIG. 10 is a block diagram illustrating an example architecture of a distributed radio access network (RAN), in accordance with certain aspects of the present disclosure.

FIG. 10 illustrates example components 1000 of BS 110a and UE 120a (e.g., in the wireless communication network 100 of FIG. 1), which may be used to implement aspects of the present disclosure. For example, antennas 1052, processors 1066, 1058, 1064, and/or controller/processor 1080 of the UE 120a and/or antennas 1034, processors 1020, 1030, 1038, and/or controller/processor 1040 of the BS 110a may be used to perform the various techniques and methods described herein.

At the BS 110a, a transmit processor 1020 may receive data from a data source 1012 and control information from a controller/processor 1040. The control information may be for the physical broadcast channel (PBCH), physical control format indicator channel (PCFICH), physical hybrid ARQ indicator channel (PHICH), PDCCH, group common PDCCH (GC PDCCH), etc. The data may be for the PDSCH, etc. The processor 1020 may process (e.g., encode and symbol map) the data and control information to obtain data symbols and control symbols, respectively. The transmit processor 1020 may also generate reference symbols, such as for the primary synchronization signal (PSS), secondary synchronization signal (SSS), and cell-specific reference signal (CRS). A transmit (TX) multiple-input multiple-output (MIMO) processor 1030 may perform spatial processing (e.g., precoding) on the data symbols, the control symbols, and/or the reference symbols, if applicable, and may provide output symbol streams to the modulators (MODs) 1032a-1032t. Each modulator 1032 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1032a-1032t may be transmitted via the antennas 1034a-1034t, respectively.

At the UE 120a, the antennas 1052a-1052r may receive the downlink signals from the BS 110a and may provide received signals to the demodulators (DEMODs) in transceivers 1054a-1054r, respectively. Each demodulator 1054 may condition (e.g., filter, amplify, downconvert, and digitize) a respective received signal to obtain input samples. Each demodulator may further process the input samples (e.g., for OFDM, etc.) to obtain received symbols. A MIMO detector 1056 may obtain received symbols from all the demodulators 1054a-1054r, perform MIMO detection on the received symbols if applicable, and provide detected symbols. A receive processor 1058 may process (e.g., demodulate, deinterleave, and decode) the detected symbols, provide decoded data for the UE 120a to a data sink 1060, and provide decoded control information to a controller/processor 1080.

On the uplink, at UE 120a, a transmit processor 1064 may receive and process data (e.g., for the physical uplink shared channel (PUSCH)) from a data source 1062 and control information (e.g., for the physical uplink control channel (PUCCH)) from the controller/processor 1080. The transmit processor 1064 may also generate reference symbols for a reference signal (e.g., for the sounding reference signal (SRS)). The symbols from the transmit processor 1064 may be precoded by a TX MIMO processor 1066 if applicable, further processed by the demodulators in transceivers 1054a-1054r (e.g., for SC-FDM, etc.), and transmitted to the BS 110a. At the BS 110a, the uplink signals from the UE 120a may be received by the antennas 1034, processed by the modulators 1032, detected by a MIMO detector 1036 if applicable, and further processed by a receive processor 1038 to obtain decoded data and control information sent by the UE 120a. The receive processor 1038 may provide the decoded data to a data sink 1039 and the decoded control information to the controller/processor 1040.

The memories 1042 and 1082 may store data and program codes for BS 110a and UE 120a, respectively. A scheduler 1044 may schedule UEs for data transmission on the downlink and/or uplink.

The controller/processor 1080 and/or other processors and modules at the UE 120a may perform or direct the execution of processes for the techniques described herein. For example, as shown in FIG. 10, the controller/processor 1040 of the BS 110a and the controller/processor 1080 of the UE 120a have an XR module (112/122 respectively) for servicing XR applications using file level metrics, according to aspects described herein.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first network entity, comprising:
    determining one or more target metrics associated with a file having a plurality of packets, wherein the one or more target metrics comprise at least one of a file level rate or a file level delay budget for communicating the plurality of packets, over a wireless network, as a group according to a file type of the file, the plurality of packets comprising at least one of a plurality of uplink packets or a plurality of downlink packets, wherein the file level rate comprises a target file error rate (FER), and wherein the file level delay budget comprises a target file delay budget (FDB);
    determining a plurality of communication parameters for communicating, over the wireless network, the plurality of packets according to the one or more target metrics associated with the file, wherein the plurality of communication parameters comprise a first communication parameter for one or more first packets of the plurality of packets and a second communication parameter for one or more second packets of the plurality of packets, wherein the second communication parameter is a same type of parameter as the first communication parameter; and
    communicating, over the wireless network, the plurality of packets with a second network entity in accordance with the plurality of communication parameters.

2. The method of claim 1, wherein each of the plurality of packets comprise one or more of a first indicator configured to identify the file and a second indicator configured to identify the file type of the file.

3. The method of claim 2, wherein the plurality of packets comprise at least the second indicator, and the method further comprises determining one or more target metrics associated with the file comprises determining the one or more target metrics associated with the file type of the file.

4. The method of claim 2, wherein the plurality of packets comprise the first indicator and the second indicator, the method further comprising grouping the plurality of packets according to the file and the file type.

5. The method of claim 1, wherein the at least one of the file level rate or the file level delay budget is associated with the file, and wherein determining the plurality of communication parameters for communicating the plurality of packets further comprises:
  setting a rate adaptation target for the communication of each of the plurality of packets to meet the target FER; and
  setting a quantity of retransmissions for the communication of each of the plurality of packets to meet the target FER.

6. The method of claim 1, wherein at least one of the file level rate or the file level delay budget comprises a target file delay budget (FDB) is associated with the file, and wherein determining the plurality of communication parameters for communicating the plurality of packets further comprises setting a packet delivery deadline of each of the plurality of packets to meet the target FDB.

7. The method of claim 1, wherein determining the one or more target metrics associated with the file comprises receiving, from a core network, downlink file information indicating the one or more target metrics associated with the file to which the plurality of downlink packets belong, and wherein communicating the plurality of packets comprises transmitting the plurality of downlink packets to a user equipment (UE).

8. The method of claim 7, wherein the downlink file information is generated by a data network (DN) external to the core network, and wherein the downlink file information is received via a user plane function (UPF) of the core network.

9. The method of claim 1, wherein determining the one or more target metrics associated with the file comprises receiving, from the second network entity, uplink file information indicating the one or more target metrics associated with the file to which the plurality of uplink packets belong.

10. The method of claim 9, wherein the first network entity is a user equipment (UE) and the second network entity is a radio access network (RAN) node.

11. The method of claim 1, further comprising receiving an indication of the one or more target metrics associated with the file from a core network.

12. The method of claim 11, wherein the indication of the one or more target metrics is received from an application function via the core network.

13. A first network entity for wireless communication, comprising:
  a memory; and
  a processor coupled to the memory, the memory and the processor configured to cause the first network entity to:
    determine one or more target metrics associated with a file having a plurality of packets, wherein the one or more target metrics comprise at least one of a file level rate or file level delay budget for communicating the plurality of packets, over a wireless network, as a group according to a file type of the file, the plurality of packets comprising at least one of a plurality of uplink packets or a plurality of downlink packets, wherein the file level rate comprises a target file error rate (FER), and wherein the file level delay budget comprises a target file delay budget (FDB);
    determine a plurality of communication parameters for communicating, over the wireless network, the plurality of packets according to the one or more target metrics associated with the file, wherein the plurality of communication parameters comprise a first communication parameter for one or more first packets of the plurality of packets and a second communication parameter for one or more second packets of the plurality of packets, wherein the second communication parameter is a same type of parameter as the first communication parameter; and
    communicate, over the wireless network, the plurality of packets with a second network entity in accordance with the plurality of communication parameters.

14. The first network entity of claim 13, wherein each of the plurality of packets comprise one or more of a first indicator configured to identify the file and a second indicator configured to identify the file type of the file.

15. The first network entity of claim 14, wherein:
  the plurality of packets comprise at least the second indicator; and
  the memory and processor, being configured to cause the first network entity to determine one or more target metrics associated with the file, are configured to cause the first network entity to determine the one or more target metrics associated with the file type of the file.

16. The first network entity of claim 14, wherein the plurality of packets comprise the first indicator and the second indicator, and wherein the memory and the processor and further configured to cause the first network entity to group the plurality of packets according to the file and the file type.

17. The first network entity of claim 13, wherein the at least one of the file level rate or the file level delay budget is associated with the file, and wherein the memory and processor, being configured to cause the first network entity to determine the plurality of communication parameters for communicating the plurality of packets, are configured to cause the first network entity to:
  set a rate adaptation target for the communication of each of the plurality of packets to meet the target FER; and
  set a quantity of retransmissions for the communication of each of the plurality of packets to meet the target FER.

18. The first network entity of claim 13, wherein the at least one of the file level rate or the file level delay budget is associated with the file, and wherein the memory and processor, being configured to cause the first network entity to determine the plurality of communication parameters for communicating the plurality of packets, are configured to cause the first network entity to set a packet delivery deadline of each of the plurality of packets to meet the target FDB.

19. The first network entity of claim 13, wherein the memory and processor, being configured to cause the first network entity to determine the one or more target metrics associated with the file, are configured to cause the first network entity to receive, from a core network, downlink file information indicating the one or more target metrics associated with the file to which the plurality of downlink packets belong; and wherein the memory and processor, being configured to cause the first network entity to communicate the plurality of packets, are configured to cause the first network entity to transmit the plurality of downlink packets to a user equipment (UE).

20. The first network entity of claim 19, wherein the downlink file information is generated by a data network (DN) external to the core network, and wherein the downlink file information is received via a user plane function (UPF) of the core network.

21. The first network entity of claim 13, wherein the memory and processor, being configured to cause the first network entity to determine the one or more target metrics associated with the file, are configured to cause the first network entity to receive, from the second network entity, uplink file information indicating the one or more target metrics associated with the file to which the plurality of uplink packets belong.

22. The first network entity of claim 13, wherein the memory and processor are further configured to cause the first network entity to receive an indication of the one or more target metrics associated with the file from a core network.

23. The first network entity of claim 22, wherein the indication of the one or more target metrics is received from an application function via the core network.

24. An apparatus for wireless communication, comprising:
   means for determining one or more target metrics associated with a file having a plurality of packets, wherein the one or more target metrics comprise at least one of a file level rate or file level delay budget for communicating the plurality of packets, over a wireless network, as a group according to a file type of the file, the plurality of packets comprising at least one of a plurality of uplink packets or a plurality of downlink packets, wherein the file level rate comprises a target file error rate (FER), and wherein the file level delay budget comprises a target file delay budget (FDB);
   means for determining a plurality of communication parameters for communicating, over the wireless network, the plurality of packets according to the one or more target metrics associated with the file, wherein the plurality of communication parameters comprise a first communication parameter for one or more first packets of the plurality of packets and a second communication parameter for one or more second packets of the plurality of packets, wherein the second communication parameter is a same type of parameter as the first communication parameter; and
   means for communicating, over the wireless network, the plurality of packets with a network entity in accordance with the plurality of communication parameters.

25. The apparatus of claim 24, wherein each of the plurality of packets comprise one or more of a first indicator configured to identify the file and a second indicator configured to identify the file type of the file.

26. The apparatus of claim 24, wherein the at least one of the file level rate or the file level delay budget is associated with the file, and wherein the means for determining the plurality of communication parameters for communicating the plurality of packets further comprises:
   means for setting a rate adaptation target for the communication of each of the plurality of packets to meet the target FER; and
   means for setting a quantity of retransmissions for the communication of each of the plurality of packets to meet the target FER.

27. The apparatus of claim 24, wherein at least one of the file level rate or the file level delay budget is associated with the file, and wherein the means for determining the plurality of communication parameters for communicating the plurality of packets further comprises means for setting a packet delivery deadline of each of the plurality of packets to meet the target FDB.

28. A non-transitory computer-readable storage medium that stores instructions that when executed by a processor of an apparatus cause the apparatus to perform a method for wireless communication, the method comprising:
   determining one or more target metrics associated with a file having a plurality of packets, wherein the one or more target metrics comprise at least one of a file level rate or file level delay budget for communicating the plurality of packets, over a wireless network, as a group according to a file type of the file, the plurality of packets comprising at least one of a plurality of uplink packets or a plurality of downlink packets, wherein the file level rate comprises a target file error rate (FER), and wherein the file level delay budget comprises a target file delay budget (FDB);
   determining a plurality of communication parameters for communicating, over the wireless network, the plurality of packets according to the one or more target metrics associated with the file, wherein the plurality of communication parameters comprise a first communication parameter for one or more first packets of the plurality of packets and a second communication parameter for one or more second packets of the plurality of packets, wherein the second communication parameter is a same type of parameter as the first communication parameter; and
   communicating, over the wireless network, the plurality of packets with a network entity in accordance with the plurality of communication parameters.

* * * * *